United States Patent
Reckless et al.

(10) Patent No.: US 7,721,338 B2
(45) Date of Patent: May 18, 2010

(54) DEFEAT OF THE COPY PROTECTION OF OPTICAL DISCS

(75) Inventors: Jonny Boyd Reckless, Maidenhead (GB); Richard A. A. Heylen, Woodley Berkshire (GB)

(73) Assignee: Macrovision Corporation, Santa Clara, CA (US)

( * ) Notice: Subject to any disclaimer, the term of this patent is extended or adjusted under 35 U.S.C. 154(b) by 572 days.

(21) Appl. No.: 10/585,967

(22) PCT Filed: Feb. 4, 2005

(86) PCT No.: PCT/GB2005/000370

§ 371 (c)(1),
(2), (4) Date: Jul. 12, 2006

(87) PCT Pub. No.: WO2005/081245

PCT Pub. Date: Sep. 1, 2005

(65) Prior Publication Data

US 2007/0053260 A1 Mar. 8, 2007

(30) Foreign Application Priority Data

Feb. 19, 2004 (GB) .................. 0403719.8

(51) Int. Cl.
*G06F 12/14* (2006.01)
*G06F 17/30* (2006.01)
*G06F 21/00* (2006.01)

(52) U.S. Cl. .................. 726/26; 726/27; 713/182; 713/189; 713/193

(58) Field of Classification Search .................. None
See application file for complete search history.

(56) References Cited

U.S. PATENT DOCUMENTS 4,584,641 A * 4/1986 Guglielmino .................. 726/26

(Continued)

FOREIGN PATENT DOCUMENTS

EP 1 132 914 A2 9/2001

(Continued)

OTHER PUBLICATIONS

G@M3FR3@K, "What is Raw," posted May 1, 2001, pp. 1-3.*

(Continued)

*Primary Examiner*—Kaveh Abrishamkar
(74) *Attorney, Agent, or Firm*—Schwegman, Lundberg & Woessner, P.A.

(57) ABSTRACT

DVDs can be copy protected by incorporating regions which contain unreadable or subversive data within the data area (42). For example, such a region may be configured as a cell of a video object (VOB) (50) within a VOB file (51). Access to the region of subversive data is prevented during normal playback, for example, by ensuring that there are no pointers leading to the subversive region. To defeat such a copy protection method, the content on the copy protected optical disc is accessed by utilising the navigation provided for normal playback of the disc. Thus, the subversive regions are navigated around during copying of the disc. The accessed content is stored in a corresponding data area and, where subversive regions are identified, arbitrary data is incorporated within regions of the copy data area which correspond to regions of unreadable or subversive data in the original data area.

22 Claims, 10 Drawing Sheets

U.S. PATENT DOCUMENTS

| | | | |
|---|---|---|---|
| 4,835,757 A | 5/1989 | Abiko | |
| 5,319,627 A | 6/1994 | Shinno et al. | |
| 5,787,068 A | 7/1998 | Arps et al. | |
| 6,199,148 B1 | 3/2001 | Naito | |
| 6,577,812 B1 | 6/2003 | Kikuchi et al. | |
| 7,408,862 B2 | 8/2008 | Sako | |
| 7,609,944 B2 * | 10/2009 | Basile | 386/95 |
| 2001/0018743 A1 | 8/2001 | Morishita | |
| 2002/0069389 A1 | 6/2002 | Sollish et al. | |
| 2005/0185926 A1 * | 8/2005 | Basile et al. | 386/94 |
| 2006/0140590 A1 | 6/2006 | Murase et al. | |
| 2008/0219123 A1 * | 9/2008 | Basile et al. | 369/84 |

FOREIGN PATENT DOCUMENTS

| | | |
|---|---|---|
| EP | 1 164 590 A2 | 12/2001 |
| EP | 1 524 660 A1 | 4/2005 |
| EP | 1 528 557 A1 | 5/2005 |
| EP | 1 536 420 A2 | 6/2005 |
| FR | 2 607 953 A1 | 6/1988 |
| GB | 2 402 541 A | 12/2004 |
| JP | 5266576 | 10/1993 |
| JP | 7235130 | 9/1995 |
| JP | 07307060 A2 | 11/1995 |
| JP | 09115242 A | 5/1997 |
| JP | 11283340 A | 10/1999 |
| JP | 11317012 A | 11/1999 |
| JP | 2000105970 A | 4/2000 |
| JP | 2001216418 A2 | 8/2001 |
| JP | 2001307424 A2 | 11/2001 |
| JP | 2002251820 A | 9/2002 |
| JP | 2002251820 A | 9/2002 |
| JP | 2003-015960 | 1/2003 |
| JP | 2003257120 A | 9/2003 |
| JP | 2003-283980 | 10/2003 |
| JP | 2004022098 A | 1/2004 |
| WO | WO97/02531 | 1/1997 |
| WO | WO 98/03973 | 1/1998 |
| WO | WO 98/52194 | 11/1998 |
| WO | WO 00/74053 A1 | 12/2000 |
| WO | WO 01/61695 A1 | 8/2001 |
| WO | WO 01/61696 A1 | 8/2001 |
| WO | WO-0178074 A1 | 10/2001 |
| WO | WO 02/11136 A1 | 2/2002 |
| WO | WO 03/034424 A2 | 4/2003 |
| WO | WO 03/077246 A2 | 9/2003 |
| WO | WO-03088239 A1 | 10/2003 |
| WO | WO 2004/109678 A1 | 12/2004 |
| WO | WO-2005081245 A2 | 9/2005 |

OTHER PUBLICATIONS

International Search Report for PCT/GB2005/000370 mailed Jul. 24, 2006, 2 pages.

Fox, Barry, "Copy Protection on CDs is 'worthless'", published Nov. 6, 2002, New Scientist. Available from : http://www.newscientist.com/article.ns?id=dn3020 [Accessed Sep. 23, 2005], 2 pages.

Halderman, John A, 2002, "Evaluating New Copy-Prevention Techniques for Audio CDs", Published on the internet and in "Proceedings of the 2002 ACM Workshop on Digital Rights Management (DRM2002)", Available from : http://www.cs.princeton.edu/~jhalderm/papers/drm2002.pdf [Accessed Sep. 23, 2005 ], 18 pages.

Halderman, J. Alex, 2002, "Evaluating New Copy-Prevention Techniques for Audio CDs", Princeton University and "Proceedings of the 2002 ACM Workshop on Digital Rights Management (DRM 2002)", Available from: http://www.cs.princeton.edu/~jhalderm/papers/drm2002.ppt [Accessed Sep. 23, 2005], 23 pages.

"Disabling/Bypassing Unwanted Titles (Version 2)", http://forum.doom9.org/showthread.php?s=&threadid=50245, 19 pgs.

"How to Partially Blank Out a Multi-PGC TitleSet", http://forum.doom9.org/showthread.php?s=&threadid=60596, 18 pages.

"Full DVD Backup Guide", http://web.archive.org/web/20031209132144/www.doom9.org/mpg/doitfast-guide.htm, 25 pages.

PSX Pirate, Nov. 9, 1998, "CDRWIN CD-Copy Settings", Entry on web page : "GameCopyWorld-CD Backup Hints-Obsolete", Available from http://m0002.gamecopyworld.com/games/gcw_hints.shtml,[Accessed Sep. 26, 2005] 8 pages.

"vStrip Guide", http://www.doom9.org/vstrip.htm, 10 pages.

"What's on a DVD ?" http://www.doom9.org/dvd-structure.htm, 4 pages.

GB Search Report for GB0502367.6 dated May 12, 2005, 1 page.

GB Further Search Report for GB0502367.6 dated Sep. 26, 2005, 1 page.

Chinese Application Serial No. 200580005541.2, Office Action mailed Feb. 6, 2009, 10 pgs.

Japanese Application No. 2006-553638, Office Action Mailed on Jan. 20, 2009, 13 pgs.

"U.S. Appl. No. 10/939,186, Non-Final Office Action mailed Mar. 13, 2005", 23 pgs.

"European Application Serial No. 05250583, Search Report completed Jul. 12, 2006", 3 pgs.

"United Kingdom Application Serial No. GB0502253.8, Search Report mailed Mar. 22, 2005", 1 pg.

Japanese Application Serial No. 2006-553638, Office Action mailed Aug. 19, 2008, 13 pgs.

"U.S. Appl. No. 10/939,186, Final Office Action mailed Aug. 5, 2009", 17 Pgs.

"U.S. Appl. No. 10/939,186, Response filed Jan. 5, 2010 to Final Office Action mailed Aug. 5, 2009", 14 pgs.

"Australia Application Serial No. 2005215762 office Action Mailed Nov. 10, 2009", 1 pgs.

"Japanese Application Serial No. 2006-553638, Final Office Action mailed Oct. 27, 2009", 6 pgs.

* cited by examiner

DEFEAT OF THE COPY PROTECTION OF OPTICAL DISCS

The present invention relates to a method of copying a copy protected optical disc and to apparatus for copying a copy protected optical disc.

The applicants' copending application Ser. No. 10/939,186 describes a technique for copy protecting an optical disc carrying content and control data in a data area. Thus, in this proposal, content is arranged on the optical disc in one or more content files and control data provides access to the content. At least one region which contains unreadable or subversive data is provided within the data area, and access to the or each said region is prevented during normal playback of the content on the disc.

In such a method of copy protection, the unreadable or subversive data which has been provided on the disc does not interfere with any legitimate usage of the disc because there is no navigation on the disc which accesses the unreadable or subversive data. This means, therefore, that unreadable or subversive data which is particularly effective can be incorporated onto the disc to provide maximum copy protection.

The present invention seeks to provide methods to subvert such copy protection.

According to a first aspect of the present invention there is provided a method of copying a copy protected optical disc, the optical disc carrying content and control data in a data area, the content being arranged in one or more content files, and the control data providing access to the content, wherein at least one region which contains unreadable or subversive data is provided within the data area, and wherein access to the or each region of unreadable or subversive data is prevented during normal playback of the content on the disc, the method comprising:

accessing the content on the copy protected optical disc by utilising the navigation provided for normal playback of the disc, storing the accessed content in a corresponding data area, and possibly including arbitrary data in any regions of the corresponding data area which correspond to regions containing unreadable or subversive data.

In this respect, if an attempt is made to copy the copy protected optical disc by extracting the data in the conventional linear manner, the unreadable or subversive data will prevent the copying process.

In embodiments of the present invention, navigation paths can be utilised to ensure that the unreadable or subversive data is not accessed during the copying process.

In one embodiment, the navigation provided for normal playback comprises navigation paths defined by said control data which access the content on the disc, and there are no navigation paths which provide access to the at least one region of unreadable or subversive data, and the method further comprises accessing the content on the copy protected optical disc by navigating to the content utilising the navigation paths.

For example, the navigation paths are mapped to identify regions of the data area which are not accessed by said navigation paths. The copying method may then further comprise accessing the data area in a linear manner and storing the content therein, but avoiding accessing any region identified as not accessed by navigation paths and storing arbitrary data in place of the content in the corresponding regions of the data area.

Alternatively, the copying method further comprises playing the disc whereby the content on the disc is accessed in a manner determined by the navigation paths, and storing the content retrieved from the data area in a corresponding data area to build up an image of the content and control data on the disc.

In an alternative embodiment, the navigation provided for normal playback comprises navigation paths defined by said control data which access the content on the disc, and there are navigation paths which lead to the at least one region of unreadable or subversive data, but navigation paths are such that they do not provide access to the unreadable or subversive data during normal playback or the content on the disc, and the method comprises accessing the content on the copy protected disc by navigating to the content utilising the navigation paths.

For example, navigation paths defined by the control data are mapped to identify regions of the data area which are not accessed by the navigation paths, the copying method further comprising accessing the data area in a linear manner and storing the content therein, but avoiding accessing any region identified as not accessed by the navigation paths and storing arbitrary data in place of the content in the corresponding regions of the data area.

Alternatively, the copying method further comprises playing the disc whereby the content on the disc is accessed in a manner determined by the navigation paths, and storing the content retrieved from the data area in a corresponding data area to build up an image of the content and control data on the disc.

In the above embodiments, the stored content may be utilised to produce a copy disc.

Additionally and/or alternatively, the stored content may be provided as a stored disc image and simply stored, for example, on a user's computer for playing when required.

The at least one region of unreadable or subversive data may be formed within an individual content file, as an additional content file, or as a gap between two adjacent content files, and the method may then comprise accessing the content files to retrieve their content, and storing the content in corresponding content files. In this respect, the content files are preferably video object files and are composed of video objects (VOBs) which are divided into cells. The cells can be accessed by respective pointers in navigation paths defined by the control data.

In one embodiment, the arbitrary data included in said regions of the data area comprises sectors of zeros.

The present invention also extends to a method of copying a copy protected optical disc, the optical disc carrying content and control data in a data area, the content being arranged in one or more content files, and the control data providing access to the content, wherein at least one region which contains unreadable or subversive data is provided within the data area, and wherein access to the or each region of unreadable or subversive data is prevented during normal playback of the content on the disc, the method comprising:

reading the content in the data area of the copy protected optical disc in a linear manner, and storing the content from the data area in a corresponding data area, but, upon encountering a region of unreadable or subversive data, recognising that a region of the disc contains subversive data, and using search techniques to determine the overall size of the subversive region, ceasing to read that region and storing arbitrary data in regions of the data area corresponding to said region.

The subversive region is 'skipped' as part of the copying process, thereby avoiding the time consuming process of waiting for the DVD drive to attempt to read each sector of subversive data. Copying is resumed after the subversive region.

If required, the method may comprise burning a disc from the stored information.

Generally, the at least one region of unreadable or subversive data is formed within content files, as an additional content file, or as a gap between two adjacent content files. The content files may be video object files and are composed of video objects (VOBs) which are divided into cells, and the cells can be accessed by respective pointers in a program path. In one embodiment, there are no pointers on the disc providing access to the at least one region of unreadable or subversive data. Alternatively, there are pointers on the disc accessing the at least one region of unreadable or subversive data but navigation paths are such that the unreadable or subversive data is not accessed during normal playback of the content of the disc.

Preferably, the arbitrary data included in said regions of the data area comprises sectors of zeros.

The present invention also extends to apparatus for copying a copy protected optical disc, the optical disc carrying content and control data in a data area, the content being arranged in one or more content files, and the control data providing access to the content, wherein at least one region which contains unreadable or subversive data is provided within the data area, and wherein access to the or each region of unreadable or subversive data is prevented during normal playback of the disc, said apparatus comprising:

means for accessing the content on the disc by utilising the navigation provided for normal playback of the disc; and means for storing the accessed content in a corresponding data area.

In one embodiment, the navigation provided for normal playback comprises navigation paths defined by the control data which access the content of the disc, but there are no navigation paths which provide access to the at least one region of unreadable or subversive data, and said means for accessing the content on the disc comprises means for mapping the navigation paths, and means for accessing regions of the data area which have not been identified as said regions, in a linear manner, and wherein said storage means is arranged to store the accessed content from the data area into a corresponding data area, and to store arbitrary data into said regions of the corresponding data area.

Where the navigation provided for normal playback comprises navigation paths defined by the control data which access the content of the disc, and there are navigation paths which lead to the at least one region of unreadable or subversive data, the navigation paths may be such that they do not provide access to the unreadable or subversive data during normal playback of the content on the disc, and said means for accessing the content on the disc comprises means for mapping the navigation paths to identify regions of the data area which are not accessed by said navigation paths, and means for accessing regions of the data area which have not been identified as said regions, in a linear manner, and wherein said storage means is arranged to store the accessed content from the data area into a corresponding data area, and to store arbitrary data into said regions of the corresponding data area.

In an alternative embodiment, said means for accessing the content on the disc comprises means for receiving the output from an optical disc player, and wherein said means for storing is arranged to retrieve the content from the output and to store the retrieved content in a corresponding data area whereby a copy of the content and possibly the control data on the disc is stored.

The present invention also extends to apparatus for copying a copy protected optical disc, the optical disc carrying content and control data in a data area, the content being arranged in one or more content files, and the control data providing access to the content, wherein at least one region which contains unreadable or subversive data is provided within the data area, and wherein access to the or each region of unreadable or subversive data is prevented during normal playback of the disc, the apparatus comprising:

means for reading the content on the disc in a linear manner;

means for storing the content in the data area in a corresponding data area;

means for halting reading by said reading means on encountering unreadable or subversive data in a region of the data area; and means incorporating arbitrary data into regions of said corresponding data area which correspond to said region; and means by which copying is resumed after the subversive region.

Apparatus as defined above may additionally comprise means for burning the accessed content and the incorporated arbitrary data onto an optical disc.

Embodiments of the present invention will hereinafter be described, by way of example, with reference to the accompanying drawings, in which.

The present invention is applicable to optical discs in general, but is described herein with reference to DVD-formats. The invention is applicable to all DVD formats.

As is known to those skilled in the art, data is written to a DVD by appropriate mastering means in a bit stream to form pits and lands on the disc. In this respect, in a DVD writer the mastering means will generally be a laser beam recorder. Laser beam recorders are also used in mastering houses, but alternative mastering techniques are available and may be utilised.

Figure 1:
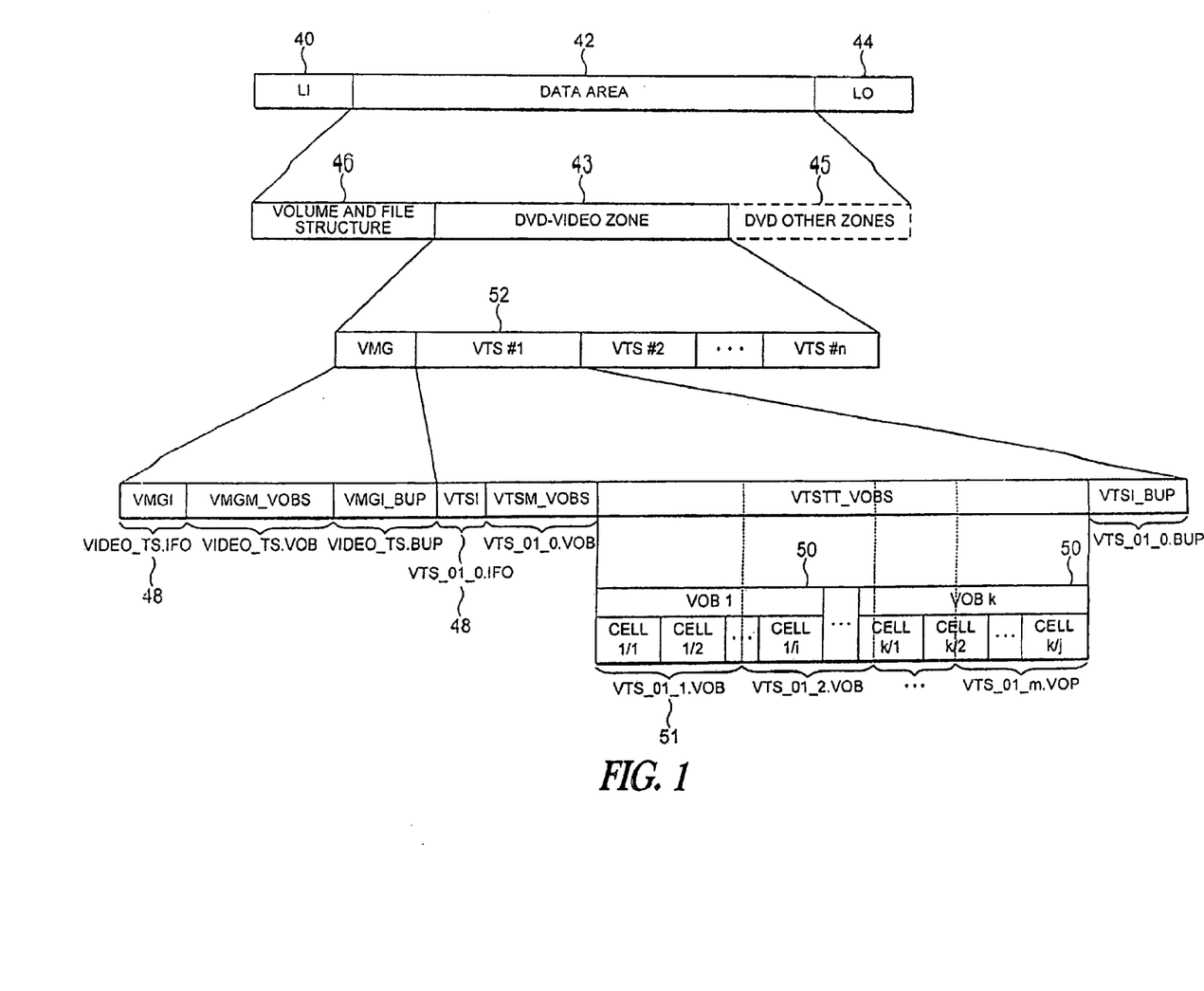
FIG. 1 illustrates the structure of data on a DVD.

As is well known, the pits extend along a spiral track on the surface of the disc and are separated by lands. Thus, the data on the DVD is arranged along the spiral track. As shown in FIG. 1, this data along the spiral track is structured to have a Lead-in 40, a data area 42 and a Lead-out 44.

The structure of the data on the DVD is the subject of standards, and is well known to those skilled in the art. Accordingly, only parts of the data structure which are relevant to the present invention are described and illustrated herein. As is further indicated in FIG. 1, the data area 42 includes a volume descriptor 46 which identifies the structure and contents of the data in the data area 42. This volume descriptor 46 is followed by a DVD-Video zone 43 and possibly by other DVD zones 45. The DVD-Video zone 43 comprises structures such as a Video Manager (VMG) and a number of video title sets (VTSs). Information files (IFO) 48 are provided in the Video Manager (VMG) and in each of the video title sets (VTSs) and provide the syntax by which navigation to video objects (VOBs) 50 is achieved. As is well known, each video object 50 contains MPEG streams, such as video, audio, and other content streams. The other content streams may comprise text and graphics, for example. A video object 50 also includes control data for controlling the presentation of it content together with control data enabling the data within the video object to be searched. The video objects 50 compose a set of video objects for the titles (VTST-T_VOBS) in video title set VTS#1. The VTSTT_VOBS is divided into video object files 51 whose size does not exceed 1 GB.

Figure 2:
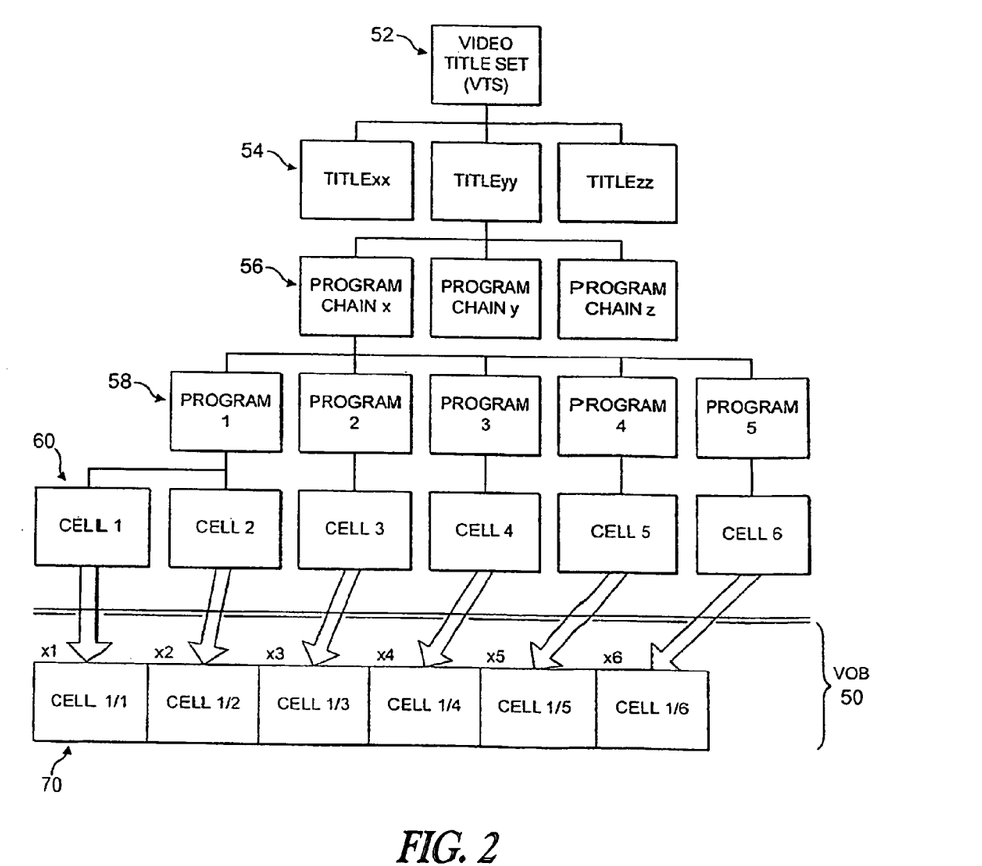
FIG. 2 shows the structure of a video title set (VTS) in a DVD.

FIG. 2 shows the structure of a video title set (VTS) and illustrates how, in a DVD, a movie, for example, stored in a single video object 50, can be accessed and navigated and thereby played.

In FIG. 2, not all of the connections and pointers between files in the DVD-Video structure have been illustrated. Instead, FIG. 2 illustrates how a single video object 50 is addressed.

In the structure illustrated in FIG. 2 there is a video title set (VTS) 52 containing a collection of titles 54. Each title 54 includes one or more program chains 56. In FIG. 2, the title 54 "TITLE yy" addresses the chosen video object 50 and does so by way of program chain x. Each program chain 56 includes a number of individual programs as 58 which are typically arranged to be played in sequence. Each of the programs 58 has one or more pointers as 60, and each pointer 60 addresses a particular part of the corresponding video object.

As is illustrated in FIG. 2, each video object 50 is divided into a number of individual cells 70. Typically, each of the programs 58 points, by way of its pointer 60, to an individual one of the cells 70 of the video object 50. However it is possible as also indicated in FIG. 2 for a single program 58, as program 1, to have more pointers 60, for example, two pointers which address two cells 70, as cells 1/1 and 1/2. The arrangement is generally that, as the programs 58 are played in sequence by way of the relevant program chain 56, the cells 70 within the video object 50 are similarly accessed in order.

Figure 3:
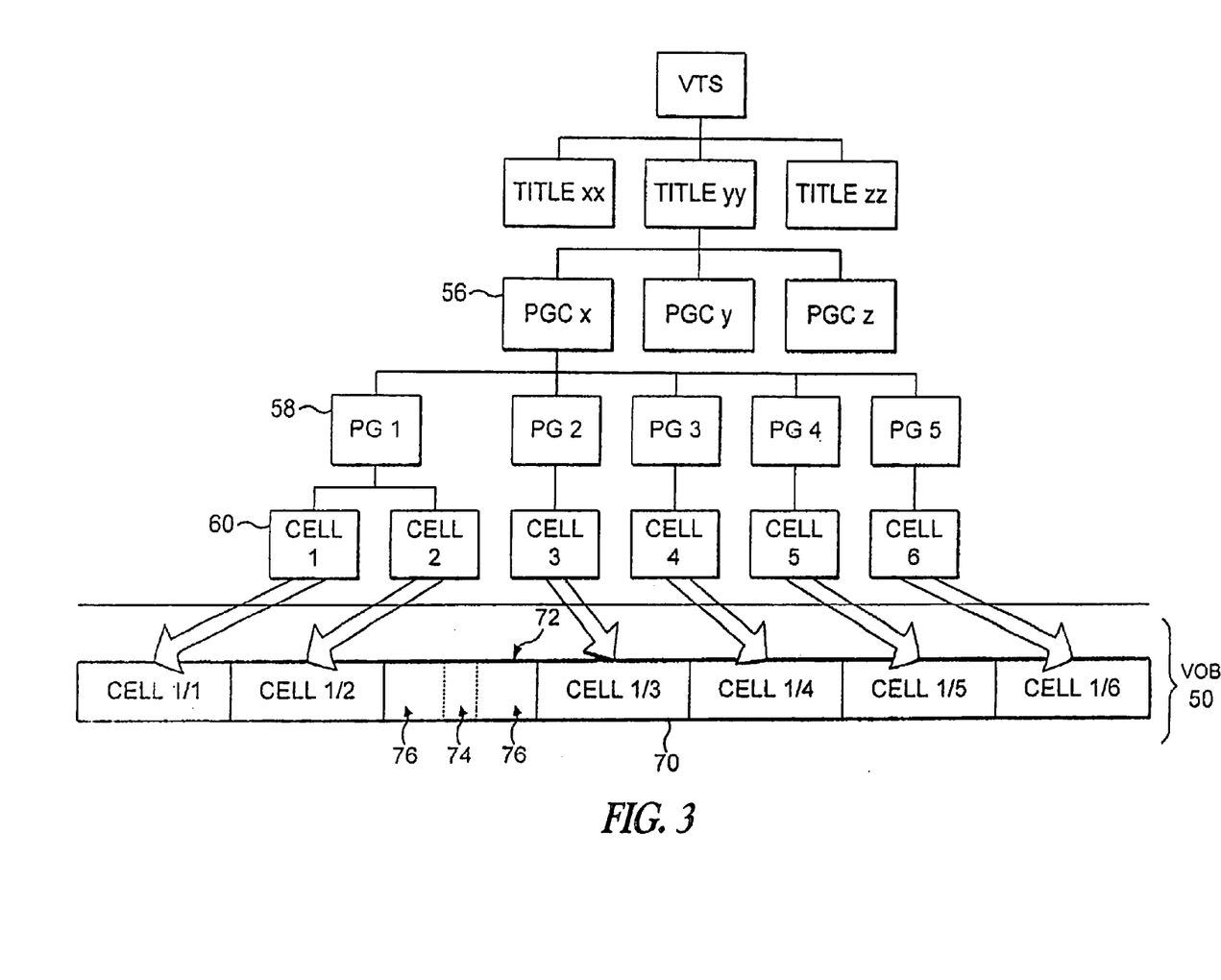
FIG. 3 shows a view similar to that of FIG. 2 but illustrating copy protection by the provision of an unstructured region in a video object.

FIG. 3 shows an arrangement similar to that of FIG. 2 except that the DVD illustrated in FIG. 3 has been copy protected by a technique as described and claimed in the applicants' copending U.S. application Ser. No. 10/939,186. It will be seen, by a comparison of FIGS. 2 and 3, that an unstructured region 72 has been interposed between two cells 70 of the video object 50. As is also shown in FIG. 3, subversive data indicated at 74 has been incorporated within the unstructured region 72. There is a buffer area 76 on either side of the subversive data 74 within the unstructured region.

The subversive data 74 in the unstructured region 72 of the video object 50 may be any data which will stop or subvert a drive reading or playing the content of the region 72 on an optical disc, and/or will stop or significantly slow down the copying of data from the optical disc and/or will prevent usable copies of data on the disc being made. Examples of subversive data which meet these requirements include data with incorrect error correcting codes, and information which has been deliberately altered. The data might be, or include, data patterns chosen to cause DSV problems, for example, chosen to ensure that the DSV has a significant absolute value and/or that the DSV has a rapid rate of change. A description of DSV data patterns and the problems they cause is given, for example, in WO 02/11136. It is additionally and/or alternatively possible to provide data which has mistimed waveform transitions.

In the main, it is expected that values of the data, which may be content and/or control data, will be changed during encoding of the data onto the optical disc whereby the subversive data is produced. However, it is additionally and/or alternatively possible to provide subversive data on the optical disc by mechanically or physically damaging bits or sectors of bits on the disc.

Examples of data which has been altered, and which can therefore provide subversive data for copy protecting a disc are described, for example, in WO 00/74053, WO 01/61695 and WO 01/61696.

Of course, when provided on an original disc, subversive data could cause problems for a device seeking to play or otherwise use the optical disc for legitimate purposes. Accordingly, and as shown in FIG. 3, steps may be taken to ensure that during normal use of the optical disc, for example, during play by a device, the subversive data 74 is never accessed. In this respect, and as illustrated in FIG. 3, there are no pointers 60 in the main program chain 56 pointing to the unstructured region 72. It will also be appreciated from a consideration of FIG. 3, that if the program chain 56, for example, is executed, the device will not navigate to the unstructured region 72. In this way, the subversive data can be provided on the disc without any risk that it will subvert normal playing of the disc.

As set out above, there is a buffer area 76 on either side of the subversive data 74 within the unstructured region 72. In this respect, some devices do read ahead when playing a disc. Thus, it may be that a device which has been caused to access the first cell and then the second cell of the video object file 50 may look ahead to the next cell and, in the arrangement of FIG. 3, would encounter the unstructured region 72. To ensure that there is no risk that any such look ahead techniques would encounter the subversive data 74, the areas of buffer data are provided. Generally, the data within the buffering zones 76 has non-subversive properties and, for example comprises pluralities of zeros.

Thus, it will be understood from the above that a DVD can be provided with subversive data as 74 without risk that that subversive data will adversely affect normal playing of the disc.

When an attempt is made to read data from a copy protected disc as illustrated in FIG. 3, rather than playing the video and audio content on the disc, many commercially available devices arranged to copy DVDs seek to extract all of the data on the disc. Copying is generally undertaken on a sector by sector or on a file by file basis. For example, the device accesses each sector on the disc in turn to extract the data in that sector. Thus, during a copying operation, the device will access the unstructured region 72. It is possible that the subversive data 74 in the unstructured region 72 will cause the read operation of the disc to fail or to be slowed significantly. Alternatively, the subversive data may result in the generation of error flags which will mean that any copy that the device is able to make will generally be unplayable.

Not only is it arranged that there is no navigation to the unstructured region 72, but no information about the existence or location of the region is explicitly included in the information file 48.

Alternatively, some information about the unstructured region might be included in the Video Title Set Information (VTSI) Table of the information file 48.

As illustrated in FIG. 3, subversive data 74 may be included in the video object 50 by inserting therein an unstructured region 72 also containing buffering zones 76.

Figure 4:
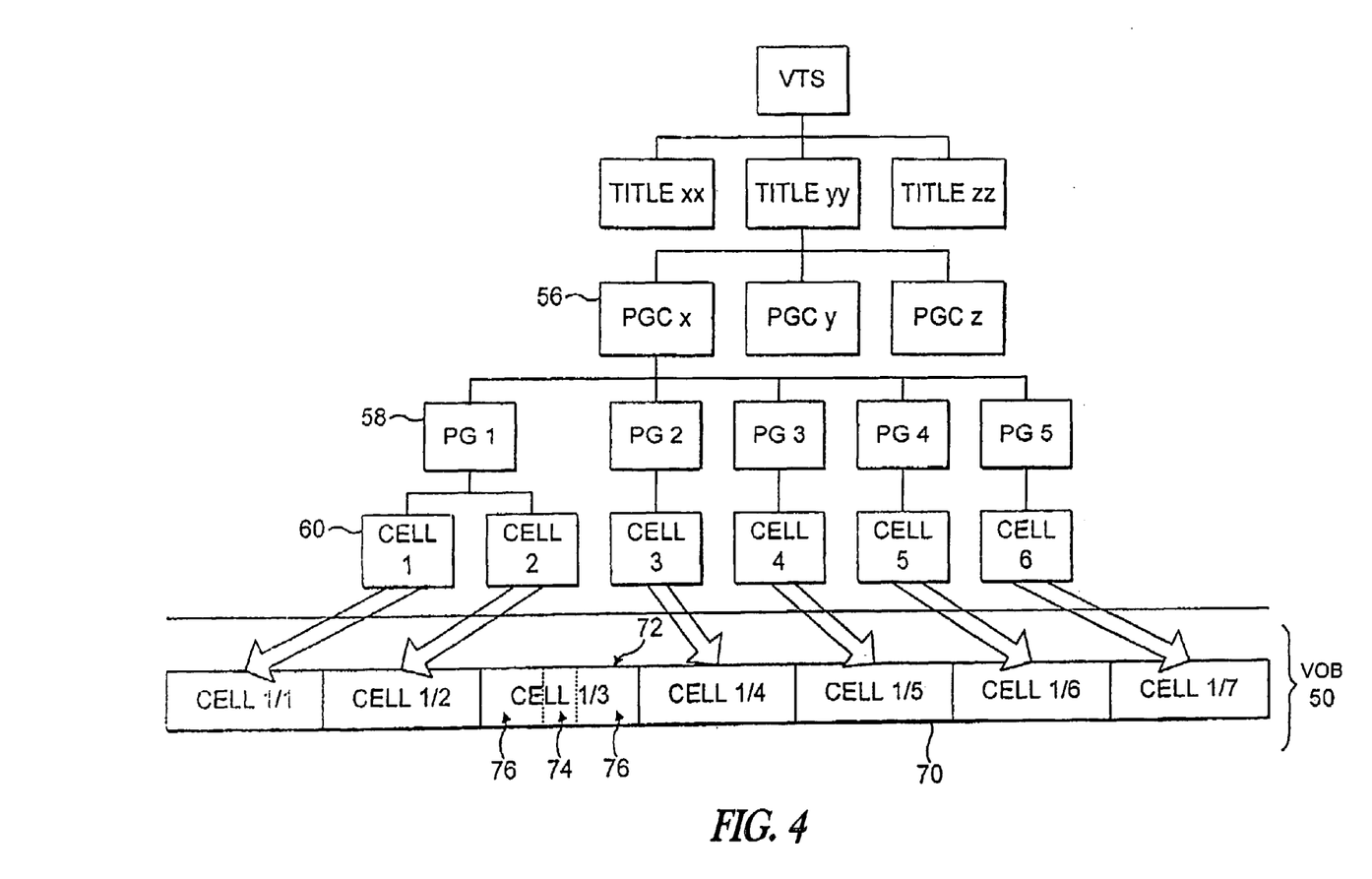
FIG. 4 is a view similar to that of FIG. 3 except that the addition to the video object is an additional cell.

As is shown in FIG. 4, the subversive data may alternatively be contained in a structured cell which is never accessed. That is, a region of subversive data may be inserted into existing or additional, but unplayed, cells. Buffering zones are then provided around the subversive data.

Where subversive data is inserted into existing or additional cells, this will increase the size of the VTSTT_VOBS. If the resulting size of the video object files 51 into which VTSTT_VOBS is divided exceeds the maximum size allowed, (1 GB), the boundaries of the video object files 51 are moved and/or new video object files 51 may be created.

In FIGS. 3 and 4, subversive data has been provided in an unstructured region and/or in an additional cell inserted into a video object 50. Subversive data may also be incorporated into one or more existing cells if it is ensured that there is no navigation to the existing cell which incorporates the subversive data during playback of the content on the disc.

Figure 5:
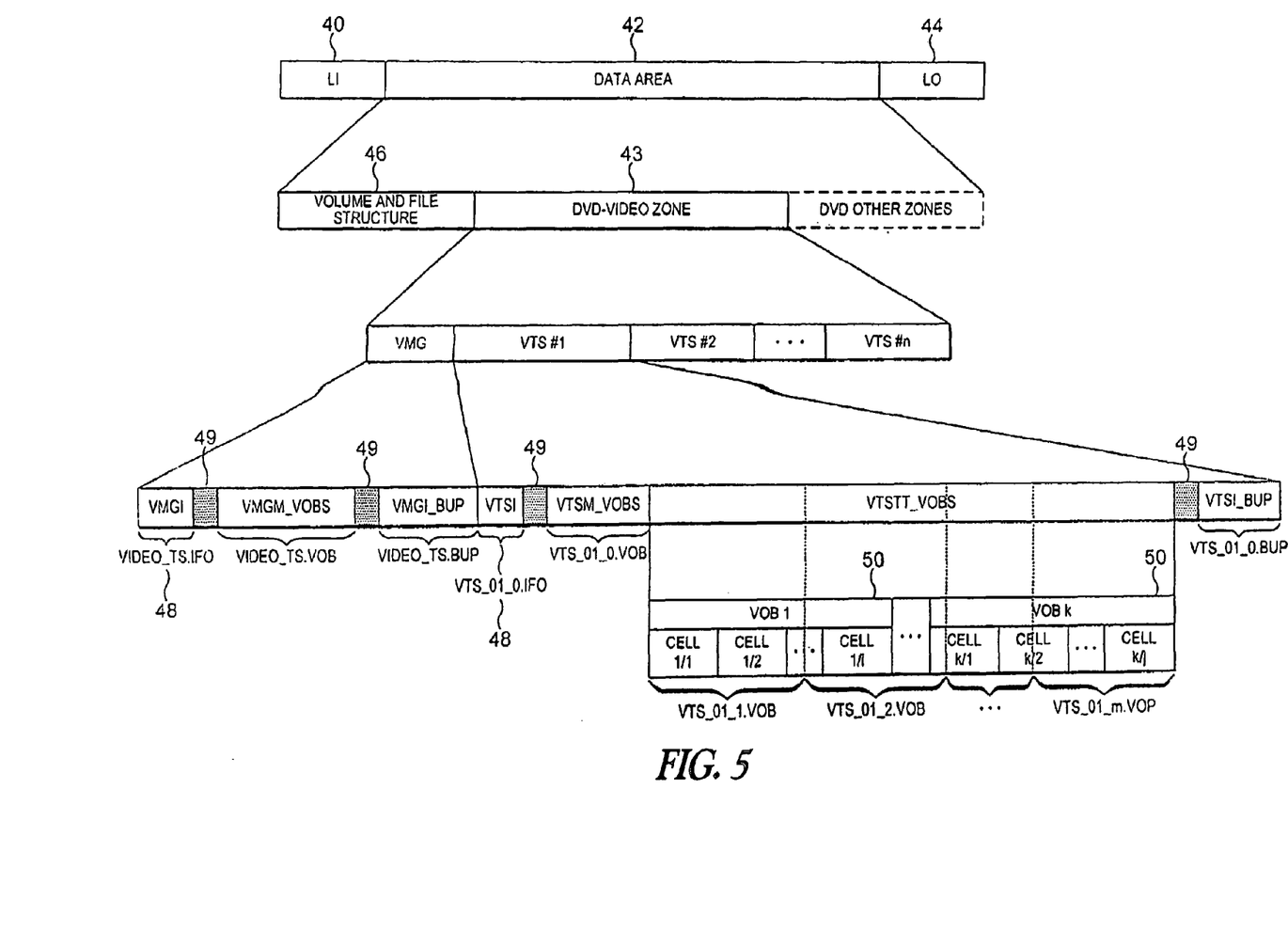
FIG. 5 is a view similar to that of FIG. 3 but shows the provision of gaps between files in a DVD-Video zone.

In FIGS. 3 and 4 the subversive data has been inserted in the video object 50. It is also possible to include the subversive data in other regions of the content files to which there is normally navigation during playback of the content on the disc. As illustrated in FIG. 5, the DVD-Video zone 43 comprises a Video Manager (VMG) and a number of video title sets (VTSs) which are composed of various files. There is navigation to these files, for example, by way of the information files (IFO) 48 provided.

Subversive data may be included in other regions of the data area to which there is no navigation during playback of the content of the disc. In some syntaxes, gaps 49 are provided between files and subversive data may be inserted into such gaps 49. It will be appreciated that no navigation is provided to such gaps 49.

Additionally and/or alternatively gaps 49, as shown in FIG. 5, may be inserted between files in the DVD-Video zone 43 and then subversive data may be inserted into the gaps created. FIG. 5 illustrates locations at which gaps 49 may be inserted.

Figure 6A:
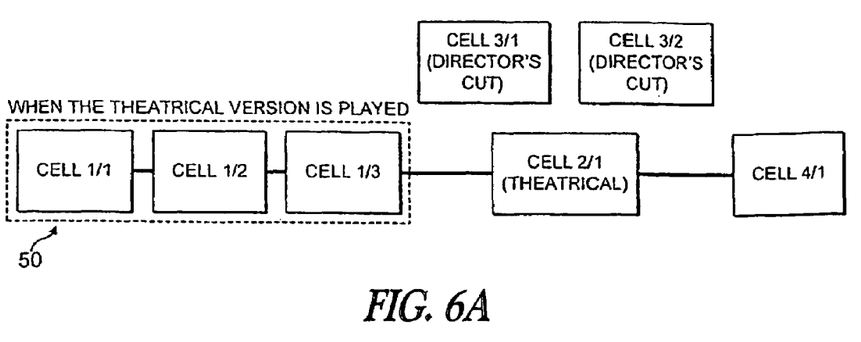
FIGS. 6a and 6b illustrate the provision of two different playback paths using interleaving of video objects.
Figure 6B:
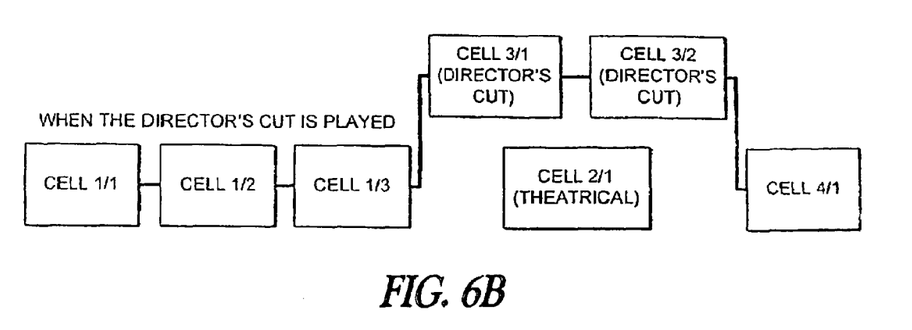

FIGS. 6a and 6b illustrate a known technique for allowing two or more versions of a movie, for example, to be carried by a single DVD in an efficient manner. The movie is stored in video objects 50 and the material which is common to both versions of the movie is only present once on the disc to preserve space. Where the two versions diverge, their content is interleaved so that the size of the jumps required by the device playing the disc during disc playback are sufficiently small that seamless playback of the content can occur.

Thus, FIGS. 6a and 6b illustrate a portion of the playback of two versions of a single movie where FIG. 6a shows playback of a first version, for example, the theatrical release version, whilst FIG. 6b shows playback of an extended version, for example, the director's cut. It will be seen, therefore, that the cells 1/1, 1/2, 1/3 of a first video object 50 (VOB 1) are common to both versions but that, in FIG. 6a, the theatrical version then plays the cell 2/1 which constitutes a second video object (VOB 2) and then moves to the first cell 4/1 of a fourth video object (VOB 4). By contrast, and as shown in FIG. 6b, the extended version omits the second video object (VOB 2), and thus the cell 2/1, and plays instead the cells 3/1 and 3/2 in a third video object (VOB 3).

Figure 7:
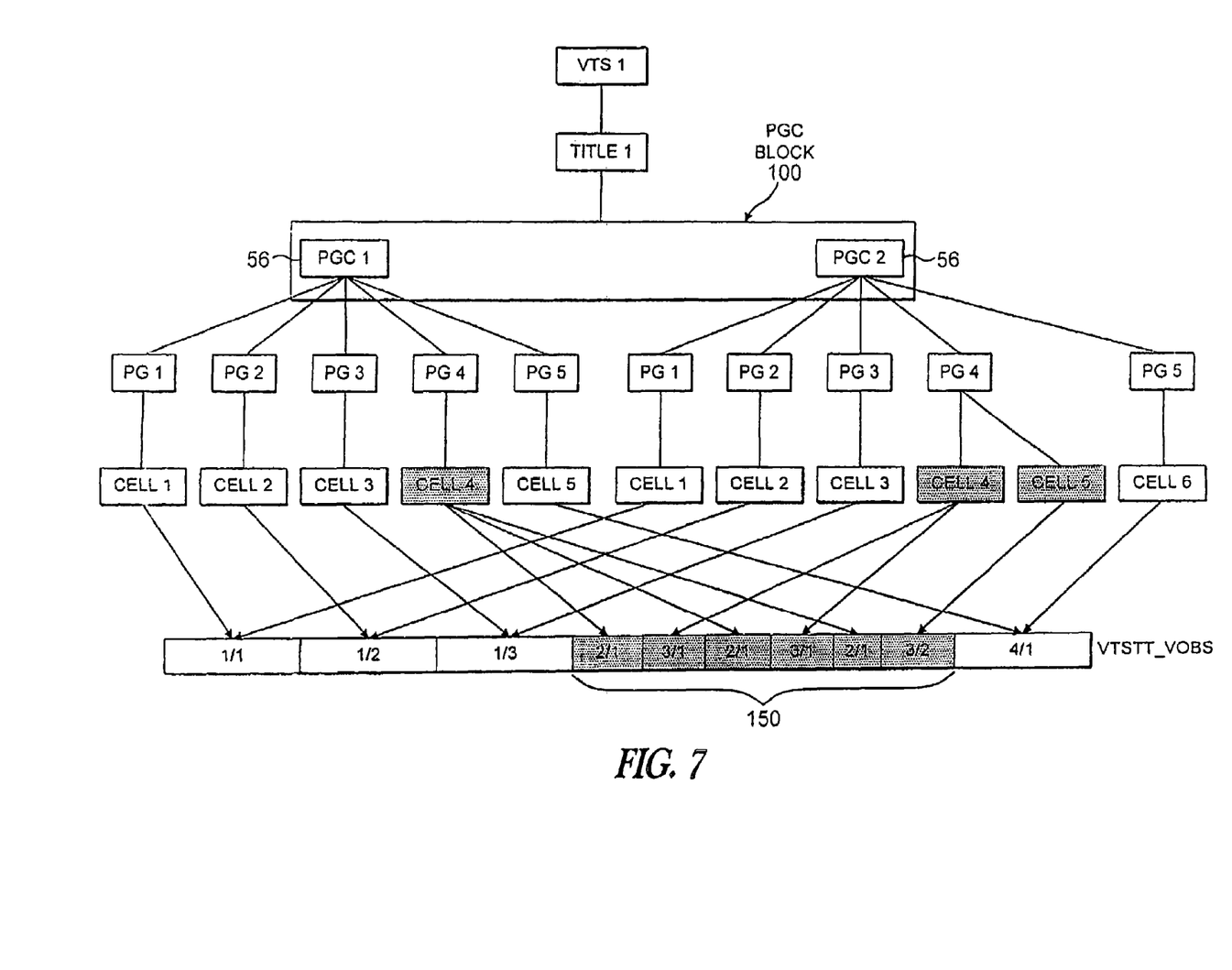
FIG. 7 shows the structure of a video title set (VTS) where interleaving is used in a technique as illustrated in FIGS. 6a and 6b.

FIG. 7 shows the structure of the video title set (VTS) for the technique illustrated in FIGS. 6a and 6b and shows an arrangement of the cells 2/1 and 3/1 and 3/2 of FIGS. 6a and 6b on the disc. As is illustrated in FIG. 7, the second and third video objects, VOB 2 and VOB 3 have each been sliced into three parts and have been interleaved as indicated at 150 to form three interleaved units (ILVUS). The effect is to interleave the cell 2/1 with cell 3/1 and with cell 3/2.

As is shown in FIG. 7, a program chain block 100 containing two program chains 56 is provided. The first program chain PGC 1 will play the theatrical version of the movie as illustrated in FIG. 6a, whilst the second program chain PGC 2 will play the director's cut version illustrated in FIG. 6b.

It will be appreciated from a consideration of FIG. 7 that when the program chain PGC 1 is executed, cells 1/1, 1/2, 1/3, 2/1 and 4/1 will be played. Thus, the pointer, cell 4, of the fourth program PG 4 of the first program chain PGC 1 accesses the three units (ILVUS) composing cell 2/1 and effectively jumps over the unwanted interleaved cells 3/1 and 3/2. Similarly, when the second program chain PGC 2 is executed, cells 1/1, 1/2, 1/3, 3/1, 3/2 and 4/1 are played whereby the director's cut as shown in FIG. 6b is played.

Figure 8A:
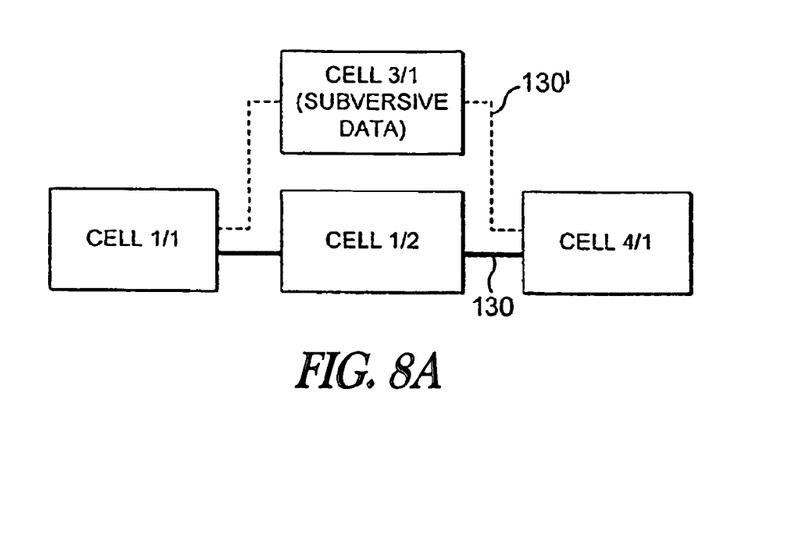
FIGS. 8a and 8b shows the provision of subversive data in interleaved content in a video title set.
Figure 8B:
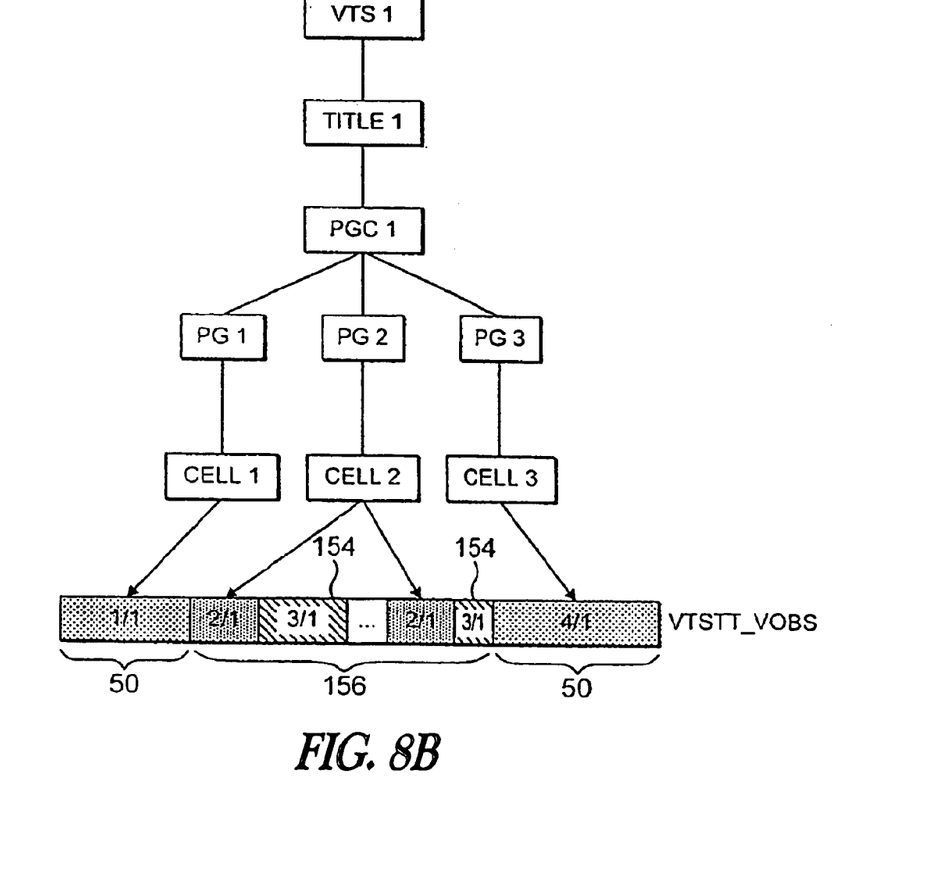

This interleaving technique can be utilised to provide an alternative copy protection technique as described above, as is illustrated in FIGS. 8a and 8b. Thus, and as shown in FIGS. 8a and 8b, the cells with the content which is to be played are provided along a single, sequential, navigable path. However, an additional cell 3/1 is provided which contains subversive data. Specifically, an additional video object, VOB 3, split into one or more ILVUs 154 is provided, where one or more ILVUs 154 contain subversive data and are interleaved with existing content data.

The arrangement of the subversive data on the disc is shown in FIG. 8b which illustrates an interleaved block 156 composed of two video objects, VOB 2 and VOB 3, which have been interleaved. This interleaved block 156 is interposed between the first and fourth video objects 50. It will be appreciated that cell 1/2 contains playable information. This cell 1/2 has been assigned a new VOB ID and effectively sliced and interleaved with the ILVUs 154 of subversive data. As indicated, pointers navigate the drive over the regions of subversive data. In addition, buffer zones and other techniques may be used within the subversive data regions to ensure that they do not interfere with normal play of the disc.

The subversive data may be any data which will stop a drive reading or playing an optical disc and may be in accordance with any of the examples described above.

It will be appreciated from FIGS. 8a and 8b that subversive data 154 is provided in a cell 3/1 to which there is no navigable path. FIGS. 8a and 8b also show the logical structure of the relevant video title set VTS 1. It will be seen that the navigable path 130 of FIG. 8a includes cells 1/1, 2/1 and 4/1. The cell 3/1, containing the subversive data, is provided along a non-navigable path 130'. The structure of FIG. 8b has a single program chain PGC 1 with three programs PG 1, PG 2 and PG 3, and three pointers cell 1, cell 2, cell 3. As set out above, the subversive data 154 in the third video object has been interleaved with the second video object to form the interleaved block 156 having unplayed interleaved units 154.

It will be seen that none of the pointers cell 1, cell 2, cell 3 access the ILVUs 154. Thus, playback of the structure of FIGS. 8a and 8b will be along the playback path 130 and the subversive data 154 will not be accessed. However, and as previously, attempts to copy a disc, with a structure as in FIGS. 8a and 8b, on a sector by sector or file by file basis will either result in a failed, or significantly slow, read operation or produce an unplayable copy.

As described above, an optical disc is copy protected by incorporating subversive data in the data area, for example, in or between content files, and by ensuring that no navigable paths lead to the subversive data. This ensures that the optical disc can be played without problems but prevents the making of usable copies, particularly when copying is on a sector by sector or file by file basis. It is ensured, in the examples above, that there are no navigable paths to the subversive data by omitting pointers or other navigation or program paths which lead to, and thereby enable access to, the subversive data.

An alternative technique is to provide pointers to subversive data but to have control data associated with the navigation paths so that regions including subversive data are not accessed during playback. For example, in a structure as shown in FIGS. 8a and 8b, pointers (not shown) may be provided in program chain PGC 1 to cell 3/1. However, suitable pre-commands or other arrangements are made such that the playback of cell 3/1 is prevented.

The present invention seeks to circumvent the copy protection for an optical disc which has been described above.

As described above, the drives which can be controlled to extract the data from a disc, generally extract the data linearly on a sector by sector, file by file, or in the case of IFO parsing class of rippers, a cell by cell basis. In this eventuality, the drive is adversely affected by the subversive data provided as described above.

It will be appreciated from a consideration of FIG. 3, for example, that there may be no pointers 60 pointing to the additional cell or region 72. Alternatively, points may lead to the region of subversive data but the navigation paths providing such pointers may have been altered such that the pointers do not provide access to the subversive data. One circumvention technique of the invention, therefore, searches the contents of the disc to map all possible navigable paths. This can be done, for example, by the use of an information file parser and interpreter. By mapping all of the navigation paths, it is then possible to identify regions in the data area on the disc which are not accessed by navigation paths. These regions will include those to which there are no pointers, and regions to which there are pointers but to which navigation is prevented by appropriate commands for the navigation paths concerned. It is known that such regions, which are not accessed, will include the subversive data. Thereafter, the identified regions can be avoided during a copying procedure to enable all of the useful data to be obtained from the disc and all of the subversive data to be avoided. Generally, a copy of the data on the disc will be stored in memory. It may be advisable to store arbitrary data such as pluralities of zeros in any regions which have been identified as not addressed by navigation paths.

In an alternative approach, the data on the disc is read in a linear manner, but at a low level, for example, at the level of the bit stream, or before encoding, interleaving and scrambling of the data. If, on accessing any region, it is found that the region is unreadable or provides errors, that region is identified as one with subversive data and arbitrary data, such as a plurality of zeros, can be inserted in place of the subversive data in that region. In this way, an image of the data on the disc can be obtained.

Either of these techniques can be undertaken by appropriate software, the design of which will be within the competence of those skilled in the art.

It will be appreciated that the stored information and control data obtained from the copy protected disc by each of these techniques can be used to form a copy disc.

FIGS. 9a to 9e illustrate schematically the copy protection of a DVD and another embodiment of a method of the invention able to circumvent the copy protection. Thus, FIG. 9a indicates an original unprotected DVD, at the level of VTST-T_VOBS and indicates the video objects 50 to cells of which pointers P are directed.

Figure 9A:
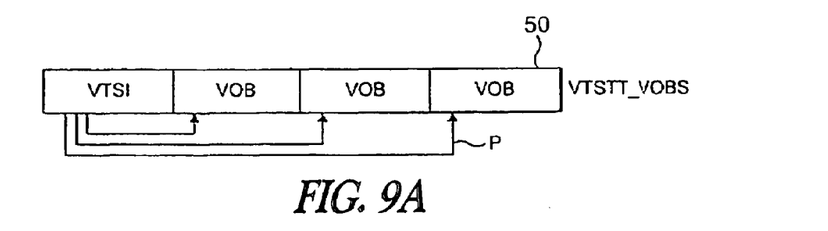
FIGS. 9a to 9e illustrate schematically VTSTT_VOBS and the copy protection of a DVD and a circumvention method of the invention.
Figure 9B:
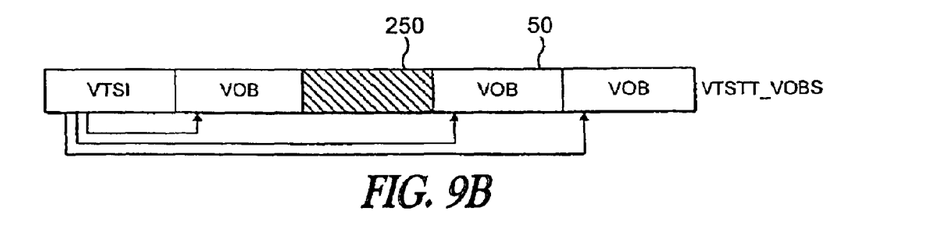

FIG. 9b indicates the interposition of a region 250 of subversive data within VTSTT_VOBS whereby the disc of FIG. 9b is copy protected as described above.

Figure 9C:
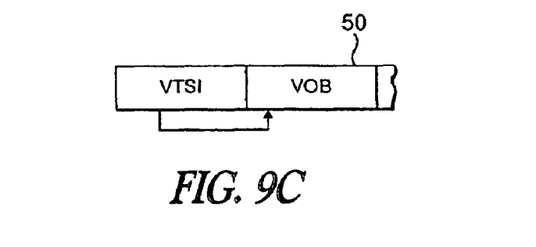

If the disc of FIG. 9b is copied by extracting the data sector by sector, or file by file, in a linear manner, as is usual, the data extracted may be somewhat as shown in FIG. 9c in which structure such as the Video Title Set Information file (VTSI) and a first video object 50 have been extracted but, the existence of the subversive data in a following region has caused the drive extracting the data to fail in its operation.

Figure 9D:
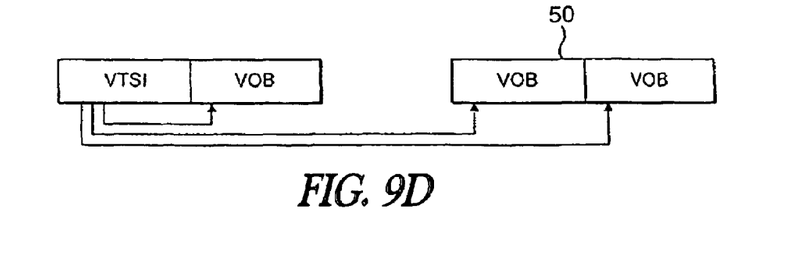

As shown in FIG. 9d, an image of the disc as illustrated in FIG. 9b can be obtained by a method of the present invention which is described further below with reference to FIG. 10. In this method, the region 250, including the subversive data, is not accessed during extraction of data so that only the VTSI and the useful video objects 50 are extracted from the data area.

Figure 9E:
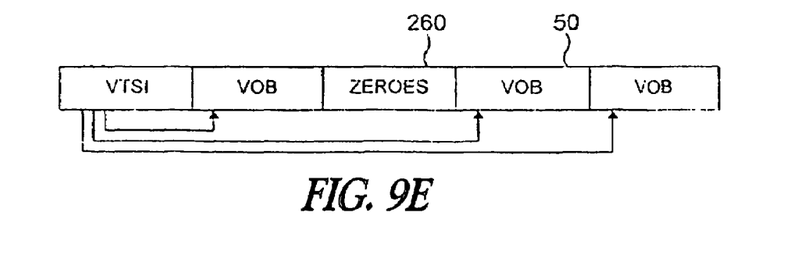

The image built up of the disc can be burned onto a copy disc as indicated in FIG. 9e. In the copy disc, the region 250 which was not accessed, has been filled with arbitrary data to create a region 260. For example, the data within the region 260 can, be a plurality of zeros. In this respect, it will be appreciated that as with the disc shown in FIG. 9b, the disc of FIG. 9e does not, in use, provide for the region 260 to be accessed. The only requirement, therefore for the arbitrary data to be incorporated in the region 260 is that it should not, itself, cause readability problems.

Figure 10:
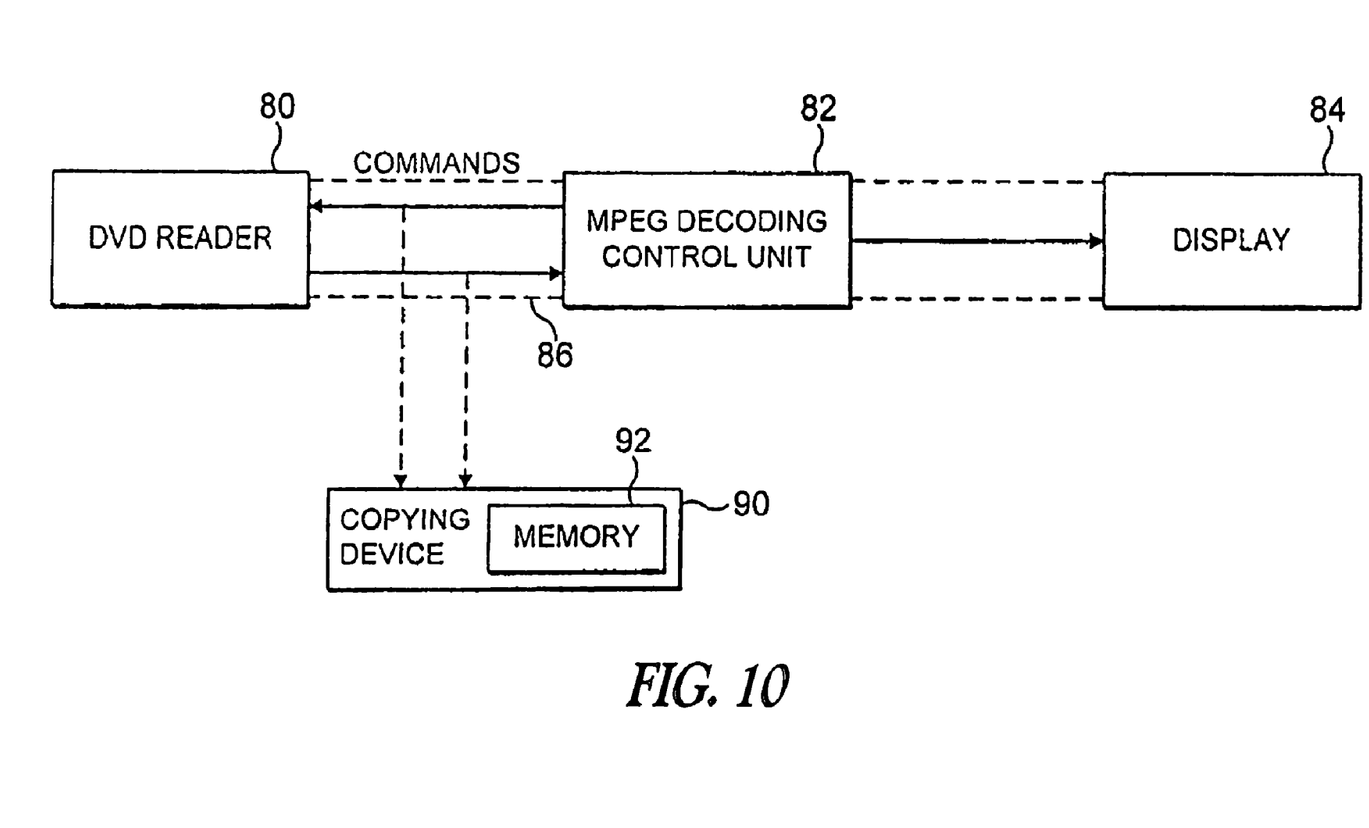
FIG. 10 illustrates an apparatus for use in circumventing the copy protection of an optical disc.

FIG. 10 shows apparatus which may be used to obtain an image of a copy protected disc as shown, for example, in FIG. 9d and which may be used to provide a copy disc as shown in FIG. 9e.

In the apparatus of FIG. 10, a DVD reader 80 is provided for playing DVDs. In known manner the DVD reader outputs video and audio, which is fed via an MPEG decoding control unit 82 to display means 84. In this respect, the number of stages in the DVD player can be chosen as required and the stages may be provided by software, hardware or firmware. The information from the DVD, which is to be displayed by way of the display means 84, is fed to the display means 84 by way of a communication channel which is indicated at 86. Commands associated with the information, either from the control unit 82, or from the data on the disc, are similarly applied to the bus 86.

The apparatus of FIG. 10 includes a copying device 90, which may be rendered in software, hardware or firmware. The copying device 90 taps into the communication channel 86 to access both the content output from the DVD reader 80, that is, a movie, for example, and the associated commands sent to, and received from, the control unit 82. The device 90 then stores in memory 92 sector data and associated commands obtained from the DVD output on the bus 86. Specifically, the copying device 90 will be able to obtain the content from a sector on the disc and identify the number of that sector. In this way, the copying device 90 is able to build up an image of the disc as shown in FIG. 9d. This image is stored in the memory 92. As described above, this stored image may then be used to produce a copy disc, as indicated in FIG. 9e.

The copying technique described is able to copy the disc, even though it has been copy protected, because it looks at the information accessed by a player and, thereby, does not access the subversive data. Thus, the copying technique works because the copy protection has been added to the disc in a way which does not interfere with the playing of the disc.

It will be appreciated that on a DVD there are often several titles. For example, there may be a movie together with features about that movie, about personnel associated with the movie, out-takes and other additional material. It will be appreciated that a full copy of the disc, therefore, can only be made if the apparatus of FIG. 10, for example, is made to play all of the titles on the disc. It would be possible, of course, for the counterfeiter to run all of the options on a disc manually. However, in a preferred embodiment the copying apparatus 90 is programmed to command the MPEG decoding control unit 82 to cause all of the information on the DVD to be read without user intervention.

As previously, the copy which is obtained on the disc, for example, the image as shown in FIG. 9d can simply be saved. This stored copy contains titles, for example, extracted from the DVD and can be utilised as if it were a physical disc whilst the device 90 remains connected to the channel 86. Thus, the stored disc image can be played upon receipt of commands from the control unit 82. Generally, however, it is to be expected that the region 160 will be filled with zeros, or other arbitrary data, and that the image would then be used to burn a DVD in the usual manner.

It will be appreciated that variations in, and amendments to, the invention as described and illustrated may be made within the scope of the appended claims.

The invention claimed is:

1. A method of copying a copy protected optical disc, the copy protected optical disc carrying content and control data in a data area, the content being arranged in one or more content files, and the control data providing access to the content, wherein at least one region of the content which contains subversive data is provided within the data area, and navigation is provided for normal playback of the copy protected optical disc, the navigation comprising navigation paths defined by said control data which can be used for access to the content on the copy protected optical disc, and wherein during normal playback of the content on the copy protected optical disc utilizing the navigation paths, access to the at least one region of subversive data is prevented, the method comprising:
 mapping the navigation paths to identify regions of the data area which are not accessed by the navigation paths,
 accessing the content on the copy protected optical disc by navigating to the content utilizing the navigation paths provided for normal playback of the copy protected optical disc, but avoiding accessing any region identified as not accessed by the navigation paths,
 storing the accessed content in a corresponding data area, and
 storing arbitrary data into any regions of the corresponding data area which correspond to any region identified as not accessed by the navigation paths.

2. A method of copying a copy protected optical disc according to claim 1, wherein there are no navigation paths which provide access to the at least one region of subversive data.

3. A method of copying a copy protected optical disc according to claim 2, wherein the method further comprising accessing the data in the data area in a linear manner.

4. A method of copying a copy protected optical disc according to claim 2, the method further comprising playing the copy protected optical disc whereby the content on the copy protected optical disc is accessed in a manner determined by the navigation paths, and storing the content retrieved in the corresponding data area.

5. A method of copying a copy protected optical disc according to claim 1, wherein there are navigation paths which lead to the at least one region of subversive data, but such navigation paths are such that they do not provide access to the subversive data during normal playback of the content on the copy protected optical disc.

6. A method of copying a copy protected optical disc according to claim 5, wherein the method further comprising accessing the data area in a linear manner.

7. A method of copying a copy protected optical disc according to claim 5, the copying method further comprising playing the copy protected optical disc whereby the content on the copy protected optical disc is accessed in a manner determined by the navigation paths, and storing the content retrieved in the corresponding data area to build up an image of the content and control data on the copy protected optical disc.

8. A method of copying a copy protected optical disc according to claim 1, wherein the copy protected optical disc is played by an optical disc player to obtain the content of the copy protected optical disc, and wherein the content output by the optical disc player is stored.

9. A method of copying a copy protected optical disc according to claim 8, further comprising commanding the optical disc player to play all of the content of the copy protected optical disc such that the copy of the content data is complete.

10. A method of copying a copy protected optical disc according to claim 1, further comprising producing a different optical disc from the stored content.

11. A method of copying a copy protected optical disc according to claim 1, wherein the at least one region of subversive data is formed within content files, as an additional content file, or as a gap between two adjacent content files, the method comprising accessing the content files to retrieve their content, and storing the content in corresponding content files.

12. A method of copying a copy protected optical disc according to claim 11, wherein the content files are video object files and are composed of video objects (VOBs) which are divided into cells, and wherein the cells can be accessed by respective pointers in navigation paths defined by the control data.

13. A method of copying a copy protected optical disc according to claim 12, wherein the at least one region of subversive data is formed as an additional cell within a video object, and wherein there are no pointers accessing the additional cell.

14. A method of copying a copy protected optical disc according to claim 12, wherein the at least one region of subversive data is formed as an additional cell within a video object, and wherein there are pointers accessing the additional cell but the use of pre commands or cell commands ensures that the additional cell is not played during normal playback of the material.

15. A method of copying a copy protected optical disc according to claim 12, wherein the at least one region of subversive data is inserted within a video object, and wherein there are no pointers accessing said region.

16. A method of copying a copy protected optical disc according to claim 1, wherein the arbitrary data included in said regions of the data area comprises sectors of zeros.

17. An apparatus for copying a copy protected optical disc, the copy protected optical disc carrying content and control data in a data area, the content being arranged in one or more content files, and the control data providing access to the content, wherein at least one region which contains subversive data is provided within the data area, and navigation is provided for normal playback of the copy protected optical disc, the navigation comprising navigational paths defined by said control data which can be used for access to the content on the copy protected optical disc, and wherein during normal playback of the content on the copy protected optical disc utilizing the navigation paths, access to the at least one region of subversive data is prevented, said apparatus comprising:
- a processor;
- a memory accessible to the processor for storing content and control data;
- an access module, executable by the processor, for accessing the content on the copy protected optical disc by navigating to the content utilizing the navigation paths provided for normal playback of the copy protected optical disc, said access module comprising a mapping module for mapping the navigation paths to identify regions of the data area which are not accessed by the navigation paths, and an access device for avoiding accessing any region identified as not accessed by the navigation paths;
- a storage module, resident in the memory, for storing the accessed content in a corresponding data area; and
- an incorporation module, executable by the processor, for storing arbitrary data into any regions of the corresponding data area which correspond to any region identified as not accessed by the navigation paths.

18. The apparatus for copying a copy protected optical disc according to claim 17, wherein there are no navigation paths which provide access to the at least one region of subversive data.

19. The apparatus for copying a copy protected optical disc according to claim 17, wherein there are navigation paths which lead to the at least one region of subversive data, but such navigation paths have been altered such that they do not provide access to the subversive data during normal playback of the content on the copy protected optical disc.

20. The apparatus for copying a copy protected optical disc according to claim 17, wherein said access module for accessing the content on the copy protected optical disc comprises a receiver for receiving the output from an optical disc player, and wherein said storage module is arranged to retrieve the content from the output and to store the retrieved content in the corresponding data area whereby an image of the content and control data on the copy protected optical disc is stored.

21. The apparatus for copying a copy protected optical disc according to claim 20, further comprising a command module for commanding the optical disc player to play all of the content on the copy protected optical disc such that the stored image of the copy protected optical disc is complete.

22. The apparatus for copying a copy protected optical disc according to claim 17, further comprising a burn module for burning the accessed content and arbitrary data onto a different optical disc.

* * * * *